US009249286B2

(12) United States Patent
Joseph

(10) Patent No.: US 9,249,286 B2
(45) Date of Patent: Feb. 2, 2016

(54) MULTIMODAL POLYETHYLENE PIPE RESINS AND PROCESS

(75) Inventor: Sebastian Joseph, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 1184 days.

(21) Appl. No.: 12/287,449

(22) Filed: Oct. 9, 2008

(65) Prior Publication Data

US 2010/0092709 A1    Apr. 15, 2010

(51) Int. Cl.
*B32B 1/08* (2006.01)
*C08L 23/06* (2006.01)
*C08L 23/08* (2006.01)
*B32B 1/02* (2006.01)

(52) U.S. Cl.
CPC ............. *C08L 23/06* (2013.01); *C08L 23/0815* (2013.01); *C08L 2308/00* (2013.01); *Y10T 428/139* (2015.01)

(58) Field of Classification Search
CPC ....... Y10T 428/139; B32B 1/08; C08L 23/06; C08L 23/0815; C08L 2308/00
USPC ............ 525/57; 526/62; 428/34.1, 34.2, 35.7, 428/35.9, 36.9, 36.8
See application file for complete search history.

(56) References Cited

U.S. PATENT DOCUMENTS

| 4,223,118 | A | 9/1980 | Tsubaki et al. |
| 4,357,448 | A | 11/1982 | Tsubaki et al. |
| 4,464,518 | A | 8/1984 | Iwabuchi et al. |
| 6,252,017 | B1 | 6/2001 | Debras et al. |
| 6,566,450 | B2 | 5/2003 | Debras et al. |
| 6,770,341 | B1 | 8/2004 | Bohm et al. |
| 6,787,608 | B2 | 9/2004 | VanDun et al. |
| 6,878,784 | B1 | 4/2005 | Asumalahti et al. |
| 6,946,521 | B2 | 9/2005 | Miserque et al. |
| 7,034,092 | B2 | 4/2006 | Marechal |
| 7,037,977 | B2 | 5/2006 | Miserque et al. |
| 7,129,296 | B2 | 10/2006 | VanDun et al. |
| 7,151,145 | B1 * | 12/2006 | Reinking ................... 526/124.3 |
| 7,193,017 | B2 | 3/2007 | Kwalk |
| 7,230,054 | B2 | 6/2007 | Mavridis et al. |
| 2004/0181010 | A1 * | 9/2004 | Miserque et al. ............. 525/191 |

FOREIGN PATENT DOCUMENTS

EP    1201 713 A1    2/2002

OTHER PUBLICATIONS

Griff, "Melt Index Mysteries Unmasked," Film Lines, Canadian Plastics Industry Association, Winter 2003.*
McGoldrick et al., "Innovative PE100 material improves the quality and productivity of injection moulded fittings," Plastics Pipes XIII, Washington, DC, 2003.*
Turner, Heather, Underground Infrastructure Management, "Just Another Drop in the Bucket," May/Jun. 2007, http://www.pepipe.org/uploads/pdfs/Just_another_drop_in_the_bucket.pdf.*
Rees, Herbert, "Mold Engineering," 2nd ed., 2002, ISBN 1-56990-322-0.*
U.S. Appl. No. 12/156,844, filed Jun. 5, 2008, Mehta, S., et al.
Razavi, Abbas, et al: "Pipes for a Lifetime": *Hydrocarbon Engineering* (Sep. 2004); pp. 99-102 Scherrenberg, R., et al.: "Product Optimization by Full Explloitation of the Intrinsic Flexibility of Bimodal Processes" Poster Paper presented at Plastics Pipes XII, Milan, (Apr. 19-22, 2004).
Scheirs, J., et al.: "PE100 Resins for Pipe Applications": *TRIP*, vol. 4, No. 12, pp. 409-415 (Dec. 1996).

* cited by examiner

*Primary Examiner* — Marc Patterson

(57) ABSTRACT

Multimodal polyethylene resins having improved stress crack resistance and melt strength rendering them useful for the manufacture of thick-walled pipe are produced in a process wherein the second stage of the process is a copolymerization conducted at a high temperature with a low comonomer to ethylene ratio and a low hydrogen to ethylene ratio.

6 Claims, No Drawings

MULTIMODAL POLYETHYLENE PIPE RESINS AND PROCESS

FIELD OF THE INVENTION

The present invention relates to a process for the production of multimodal polyethylene resins having improved melt strength which renders them useful for the production of thick-walled, large diameter pipes. More specifically, the process is a two-stage cascade polymerization process wherein the second polymerization stage is carried out at a high temperature with a low comonomer to ethylene ratio and a low hydrogen to ethylene ratio.

BACKGROUND OF THE INVENTION

High density polyethylene (PE) resins are increasingly being used for the manufacture of pipes and there is a continued need for the development of PE resins having increased resistance to stress cracking in order to extend the long-term durability of pipes produced therefrom.

Field experience has shown that pipe failures are often the result of slow crack growth and/or failure caused by sudden impact by a heavy load. As a result, slow crack growth (SCG) resistance and rapid crack propagation (RCP) tests have been developed and are used to differentiate performance of PE pipe resins. SCG resistance is determined using the so-called PENT (Pennsylvania Notched Tensile) test. The latter test was developed by Professor Brown at Pennsylvania University as a small scale laboratory test and has now been adopted as ASTM F 1473-94. RCP is determined on extruded pipe following the procedure of ISO 13477 or ISO 13478 or on a smaller scale using the Charpy Impact Test (ASTM F 2231-02).

For successful manufacture of pipe, particularly large diameter pipe, the PE resins should have sufficiently low viscosities at high shear rates to facilitate extrusion but sufficiently high viscosity at low shear rates to minimize gravitational flow (slump or sag) of the extruded profile before it has sufficiently cooled and solidified.

Resins useful for pipe applications having broad molecular weight distributions are disclosed in U.S. Pat. Nos. 6,525,148 and 6,867,278. The resins are produced using a catalyst system comprising a chromium source on an aluminophosphate support.

PE resin compositions comprised of relatively higher and lower molecular weight components and having a bimodal (BM) molecular weight distribution (MWD) have been disclosed for pipe applications. Such resins, produced using various tandem reactor polymerization processes, have an acceptable balance of strength, stiffness, stress crack resistance and processability as a result of the contributions of the different molecular weight PE species. For a general discussion of bimodal resins and processes see the articles by J. Scheirs, et al., *TRIP*, Vol. 4, No. 12, pp. 409-415, December 1996 and A. Razavi, *Hydrocarbon Engineering*, pp. 99-102, September 2004. Bimodal processes are also discussed in the article by R. Scherrenberg, et al., "Product Optimization by Full Exploitation of the Intrinsic Flexibility of Bimodal Processes" poster paper presented at Plastic Pipes XII, Milan, Apr. 19-22, 2004.

EP 1201713 A1 describes a PE pipe resin comprising a blend of high molecular weight PE of density up to 0.928 g/cm$^3$ and high load melt index (HLMI) less than 0.6 g/10 min and lower molecular weight PE having a density of at least 0.969 g/cm$^3$ and MI$_2$ greater than 100 g/10 min. The resin blends which have a density greater than 0.951 g/cm$^3$ and HLMI from 1-100 g/100 min are preferably produced in multiple reactors using metallocene catalysts.

U.S. Pat. No. 6,252,017 describes a process for copolymerizing ethylene in first and second reactors utilizing chromium-based catalyst systems. Whereas the resins have improved crack resistance they have a monomodal MWD.

U.S. Pat. No. 6,566,450 describes a process wherein multimodal PE resins are produced using a metallocene catalyst in a first reactor to obtain a first PE and combining said first PE with a second PE of lower molecular weight and higher density. Different catalysts may be employed to produce the first and second PEs.

U.S. Pat. No. 6,770,341 discloses bimodal PE molding resins with an overall density of ≥0.948 g/cm$^3$ and MFI$_{190/5}$≤0.2 g/10 min. obtained from polymerizations carried out in two successive steps using Ziegler-Natta catalysts.

Multi-modal PEs produced by (co)polymerization in at least two steps using Ziegler-Natta catalysts are also disclosed in U.S. Pat. No. 6,878,784. The resins comprised of a low MW homopolymer fraction and a high MW copolymer fraction have densities of 0.930-0.965 g/cm$^3$ and MFR$_5$ of 0.2-1.2 g/10 min.

U.S. Pat. No. 7,034,092 relates to a process for producing BM PE resins in first and second slurry loop reactors. Metallocene and Ziegler-Natta catalysts are employed and in a preferred mode of operation a relatively high MW copolymer is produced in the first reactor and a relatively low MW homopolymer is produced in the second reactor.

U.S. Pat. Nos. 6,946,521, 7,037,977 and 7,129,296 describe BM PE resins comprising a linear low density component and high density component and processes for their preparation. Preferably the resin compositions are prepared in series reactors using metallocene catalysts and the final resin products have densities of 0.949 g/cm$^3$ and above and HLMIs in the range 1-100 g/10 min.

BM PE resins comprised of low molecular weight (LMW) homopolymer and high molecular weight (HMW) copolymer and wherein one or both components have specified MWDs and other characteristics are described in U.S. Pat. Nos. 6,787,608 and 7,129,296.

U.S. Pat. No. 7,193,017 discloses BM PE compositions having densities of 0.940 g/cm$^3$ or above comprised of a PE component having a higher weight average MW and a PE component having a lower weight average MW and wherein the ratio of the higher weight average MW to lower weight average MW is 30 or above.

U.S. Pat. No. 7,230,054 discloses resins having improved environmental stress crack resistance comprising a relatively high density LMW PE component and relatively low density HMW PE component and wherein the rheological polydispersity of the high density component exceeds that of the final resin product and the lower density component. The resins can be produced by a variety of methods including processes utilizing two reactors arranged in series or in parallel and using Ziegler-Natta, single-site or late-transition metal catalysts or modified versions thereof. Silane-modified Ziegler-Natta catalysts are used to produce the narrower polydispersity lower density component.

Copending application Ser. No. 12/156,844, filed Jun. 5, 2008, discloses bimodal PE resins having improved SCG and RCP resistance by virtue of their reduced long-chain branching and a process for their preparation. The improved resins are obtained using a two-stage cascade polymerization process utilizing a high activity Ziegler-Natta catalyst system and alkoxysilane modifier.

There is a continuing need in the industry for resins that have an improved balance of properties suitable for pipe applications. There is a particular need for multimodal resins having good SCG and RCP resistance and improved melt strength suitable for the production of thick-walled pipe and for processes for making such resins utilizing Ziegler-Natta catalysts.

SUMMARY OF THE INVENTION

The present invention relates to multimodal high density PE resins useful for high performance pipe applications and to the process for their preparation. More specifically, the multimodal resins have improved resistance to stress cracking and improved melt strength rendering them high useful for the manufacture of thick-walled pipe.

The process involves polymerizing ethylene in an inert hydrocarbon medium in a first reactor in the absence or substantial absence of comonomer in the presence of a catalyst system comprised of a high activity solid transition metal-containing catalyst and organoaluminum cocatalyst and hydrogen while maintaining conditions to produce a polymerizate containing a first polyethylene resin having a density ≥0.965 g/cm$^3$ and MI$_2$ from 50 to 400 g/10 min; removing substantially all of the hydrogen from the polymerizate and transferring to a second reactor; and adding ethylene, a C$_{3-8}$ α-olefin comonomer and hydrogen to the second reactor and copolymerizing the ethylene and α-olefin at a temperature from 165 to 180° F. while maintaining the mole ratio of comonomer to ethylene in the vapor space from 0.02 to 0.1 and the mole ratio of hydrogen to ethylene in the vapor space from 0.01 to 0.05 to produce a second polyethylene resin of relatively higher molecular weight and lower density than that of the first polyethylene and obtain a multimodal resin product having a density of ≥0.946 g/cm$^3$, HLMI ≤8 g/10 min and zero shear viscosity of ≥7×10$^6$ poise comprised of 49 to 60 weight percent first polyethylene resin and 40 to 51 weight percent second polyethylene resin.

In a highly useful embodiment ethylene and butene-1 are copolymerized in the second reactor, the mole ratio of hydrogen to ethylene in the vapor space of the second reactor is from 0.025 to 0.040 and the mole ratio of butene-1 to ethylene in the vapor space of the second reactor is from 0.045 to 0.065.

Preferred multimodal PE resins have densities from 0.947 to 0.949 g/cm$^3$, HLMIs from 3 to 7 g/10 min and zero shear viscosities from 7.2×10$^6$ to 9.5×10$^6$ poise.

The invention also relates to extruded pipe comprising the multimodal PE resins.

DETAILED DESCRIPTION

The process of the invention is a two-stage cascade slurry polymerization process wherein a first PE resin is produced in a first polymerization reactor and a second PE resin is produced in a second polymerization reactor. By two-stage cascade process is meant two polymerization reactors are connected in series and resin produced in the first reactor is fed into the second reactor and present during the formation of the second PE resin. As a result, multimodal PE resin products which are an intimate mixture of the first and second PE resin components are produced. Two-stage slurry polymerization processes are known and described in U.S. Pat. No. 4,357,448 details of which are incorporated herein by reference. By slurry polymerization is meant the polymerizations are carried out in an inert hydrocarbon medium. Inert hydrocarbons useful for this purpose include saturated aliphatic hydrocarbons such as hexane, isohexane, heptane, isobutane and mixtures thereof. Hexane is a particularly useful diluent for the polymerizations.

Conditions employed in the first and second polymerization reactors are different. As a result, the first and second PE resins will have different molecular weights and the resulting final resin product will be multimodal. In general and relative to each other, the first PE resin is a lower molecular weight (MW), higher density resin and the second PE resin is a higher MW, lower density resin.

As used herein, the terms first reactor, "A" reactor, first polymerization zone or first reaction zone refer to the stage where the first relatively low molecular weight, high density PE (LMW HDPE) resin is produced. The terms second reactor, "B" reactor, second polymerization zone or second reaction zone refer to the stage where the second higher molecular weight, lower density PE (HMW PE) resin is produced.

The LMW HDPE resin is preferably a homopolymer. To this end, ethylene is polymerized in the first reactor in the absence or substantial absence of comonomer. As employed herein, the term substantial absence indicates that, if comonomer is present in the first reactor, the mole ratio of comonomer to ethylene is less than 0.01 and, more preferably, less than 0.006. As a practical matter in commercial operations where the hydrocarbon polymerization medium used is recycled, trace levels of unreacted/unrecovered comonomer will remain in the recycled hydrocarbon or recycled gases even after distillation or other treatments designed to remove comonomer. These trace levels of comonomer do not interfere with the polymerization or with the ability to produce the desired high melt strength multimodal resins provided the comonomer to ethylene molar ratios are below the above-prescribed limits.

The HMW PE resin produced in the second reactor is an ethylene-α-olefin copolymer. Useful α-olefin comonomers include C$_{3-8}$ α-olefin or mixtures thereof and butene-1, hexene-1 and octene-1 are particularly useful comonomers. In one highly useful embodiment of the invention butene-1 is copolymerized with ethylene in the second reactor to produce multimodal pipe resins.

Catalyst systems employed for the polymerizations are comprised of a solid transition metal-containing catalyst component and an organoaluminum cocatalyst component. Catalysts and cocatalysts are typically metered into the reactor dispersed in the same hydrocarbon used as the polymerization medium. The catalyst component is obtained by reacting a titanium or vanadium halogen-containing compound with a magnesium chloride support or a product obtained by reacting a Grignard reagent with a hydropolysiloxane having the formula

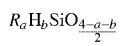

wherein R represents an alkyl, aryl, aralkyl, alkoxy, or aryloxy group as a monovalent organic group; a is 0, 1 or 2; b is 1, 2 or 3; and a+b≤3; or a silicon compound containing an organic group and hydroxyl group in the presence or absence of an aluminum alkoxide, aluminum alkoxyhalide or a reaction product obtained by reacting the aluminum compound with water.

Organoaluminum cocatalysts correspond to the general formula

wherein $R^l$ is a $C_1$-$C_8$ hydrocarbon group; X is a halogen or an alkoxy group; and n is 1, 2 or 3 and include, for example, triethylaluminum (TEAL), tributylaluminum, triisobutylaluminum (TIBAL), diethylaluminum chloride, dibutylaluminum chloride, ethylaluminum sesquichloride, diethylaluminum hydride, diethylaluminum ethoxide and the like. TEAL and TIBAL are particularly useful cocatalysts.

High activity Ziegler-Natta catalyst systems of the above types which are particularly useful for the process of the invention are known and described in detail in U.S. Pat. Nos. 4,223,118, 4,357,448 and 4,464,518, the contents of which are incorporated herein by reference.

To obtain the improved resin products of the invention, ethylene is polymerized in the first reactor in the absence or substantial absence of comonomer utilizing conditions to target the formation of a LMW HDPE having a density ≥0.965 g/cm$^3$ and MI$_2$ in the range 50 to 400 g/10 min. Target densities and MI$_2$s of polymer produced in the first reactor most typically range from 0.965 to 0.975 g/cm$^3$ and 100 to 300 g/10 min, respectively. Particularly useful multimodal resins are obtained when the LMW HDPE component has a density in the range 0.966 to 0.972 g/cm$^3$ and MI$_2$ from 140 to 250 g/10 min. Densities referred to herein are determined in accordance with ASTM D 1505. MI$_2$ is determined according to ASTM D 1238 at 190° C. and 2.16 kg. load.

Density and MI of the resin produced in the first reactor are monitored and conditions maintained, i.e., controlled and adjusted as necessary, to achieve the targeted values. In general, however, the temperature in the first reaction zone is in the range 165 to 185° F. and, more preferably, from 170 to 180° F. Catalyst concentrations will range from 0.00005 to 0.001 moles Ti/liter and, more preferably from 0.0001 to 0.0003 moles Ti/liter. Cocatalysts are generally used in amounts from 10 to 100 moles per mole of catalyst. Hydrogen is introduced to the reactor to control the molecular weight. The amount of hydrogen used will vary depending on the targeted MI$_2$; however, molar ratios of hydrogen to ethylene in the vapor space will typically range from 2 to 7 and, more preferably, from 3 to 5.5. Pressures within the reactors will typically range between 20 and 250 psig for these polymerizations.

Polymerizate, i.e., polymerization mixture from the first reactor containing the LMW HDPE polymer, is then fed to a second reactor where ethylene and a $C_{4-8}$ α-olefin are copolymerized in the presence of the LMW HDPE polymer particles to form a HMW PE copolymer and produce the multimodal polyethylene resin product.

Before introducing the polymerizate to the second reactor, a portion of the volatile materials are removed by transferring to a vessel, such as a flash drum, where the pressure is reduced to flash off the volatile materials. Substantially all of the hydrogen is removed in this step since the concentration of hydrogen required in the second reactor to form the higher molecular weight and lower melt index copolymer is substantially lower than that used in the first reactor. Substantially all unreacted ethylene and some of the hydrocarbon diluent will also be removed with the hydrogen during the devolatilization operation.

The polymerization process is continued in the second reactor where ethylene is copolymerized with a $C_{3-8}$ α-olefin comonomer in the presence of the LMW HDPE carried over with the polymerizate from the first reactor. Copolymerization in the second reactor is allowed to proceed so that the final multimodal product has a composition ratio (CR) of LMW HDPE to HMW PE from 60:40 to 49:51. In one embodiment of the invention for the production of highly useful multimodal resins for the production of thick-walled, large diameter pipes, the CR is from 55:45 to 50:50 (LMW HDPE:HMW PE). CR ratios referenced herein are on a weight basis.

Polymerization conditions employed in the second reactor are significantly different than those employed in the first reactor. Furthermore, whereas polymerization conditions employed in the first reactor to target the formation of the LMW HDPE are similar to those employed in prior art processes, it has unexpectedly been discovered that by carrying out the copolymerization in the second reactor at the high end of the temperature range and at low comonomer to ethylene molar ratios and low hydrogen to ethylene molar ratios, multimodal resins having good slow crack growth (SCG) resistance and rapid crack growth (RCP) resistance with high melt strength are obtained.

Since field experience has shown that pipe failures are often the result of slow crack growth and/or failure caused by sudden impact by a heavy load, SCG and RCP tests have been developed and are widely used to differentiate performance of PE pipe resins. SCG resistance is determined using the so-called PENT (Pennsylvania Notched Tensile) test. The latter test was developed by Professor Brown at Pennsylvania University as a small scale laboratory test and has now been adopted as ASTM F 1473-94. RCP is determined on extruded pipe following the procedures of ISO 13477 or ISO 13478 or on a smaller scale using the Charpy Impact Test (ASTM F 2231-02).

Due to the large mass of resin being extruded during the manufacture of thick-walled and large diameter pipes, significant gravitational flow can occur before the resin has sufficiently cooled. This flow can cause the extruded pipe profile to sag resulting in variations in wall thickness and non-concentricity. For this reason, high melt strength resins, i.e., resins which have high melt viscosities at low shear rates, are essential for the successful manufacture of large diameter, thick-walled pipes. Melt strength is conveniently determined on a laboratory scale using Theological measurements obtained in the frequency sweep mode and calculating zero shear melt viscosity ($\eta_o$) by fitting the viscosity shear rate curve to a rheological model such as the Sabia or Carreau-Yasuda models. Higher zero shear viscosity resins are more resistant to sag and therefore more desirable for the extrusion of large profile products and particularly extrusion of large diameter, thick-walled pipes.

For the process of the invention and to obtain the improved and highly useful pipe resins, ethylene, comonomer and hydrogen are introduced into the second reactor. Additional catalyst and/or cocatalyst may also be added if desired. Typically, however, catalyst and cocatalyst levels carried over from the first reactor in the polymerizate are sufficient for the copolymerization. Depending on how much hydrocarbon diluent is removed during the devolatilization step, it may be necessary to add additional hydrocarbon to the second reactor.

As previously pointed out, by controlling the reaction temperature and the amounts of comonomer and hydrogen charged to the second reactor relative to the ethylene charged, multimodal resin products which exhibit a high degree of resistance to stress cracking and have significantly improved melt strength, i.e., increased $\eta_o$, are obtained.

Temperatures in the second reactor are maintained at the higher end of what has heretofore typically been considered as the acceptable operating range for these types of (co) polymerizations. Temperatures in the second reactor for the present process are ≥165° F. and, more generally, in the range 165 to 180° F. Temperatures below 165° F. do not produce multimodal products having the desired balance of crack resistance and melt strength whereas reduced catalyst activity and/or polymer solubility issues result when attempting to operate much above 180° F. In one preferred embodiment, copolymerization in the second reactor is carried out at a temperature from 168° F. to 174° F.

In addition to the higher polymerization temperatures, significantly reduced amounts of comonomer and hydrogen are employed in the second reactor to produce the HMW PE copolymer and ultimately obtain the improved multimodal resin product. Ethylene, comonomer and hydrogen levels within the second reactor are measured in the vapor space and monitored to control the rate of addition. The ratio (on a mole basis) of comonomer to ethylene in the vapor space in the second reactor will vary depending on the comonomer being used; however, comonomer to ethylene molar ratios generally range from 0.02 to 0.1 and, more preferably, from 0.03 to 0.09. The mole ratio of hydrogen to ethylene in the vapor space is maintained from 0.01 to 0.05 and, more preferably, from 0.02 to 0.045. In one highly useful embodiment of the invention where the comonomer used is butene-1, the butene-1 to ethylene molar ratio is less than 0.070 and, more preferably, from 0.040 to 0.068. In an even more preferred embodiment the butene-1 to ethylene molar ratio is from 0.045 to 0.065 and the hydrogen to ethylene molar ratio from 0.025 to 0.040.

Multimodal PE resins produced in accordance with the above-described two-stage cascade slurry polymerization process and having composition ratios of LMW HDPE resin to HMW PE copolymer resin within the prescribed limits will have densities ≥0.946 g/cm$^3$, most typically, from 0.947 to 0.950 g/cm$^3$. In a highly useful embodiment, densities of the multimodal resins are in the range 0.947 to 0.949 g/cm$^3$. Physical properties of resins within these density ranges are highly useful for pipe applications. High load melt indexes (HLMIs) of the multimodal resins are ≤8 g/10 min. Preferably, HLMIs will range from 2 to 8 g/10 min and, most preferably, from 3 to 7 g/10 min. HLMIs, sometimes also referred to as MI$_{20}$, are determined in accordance with ASTM D1238 at 190° C. with a load of 21.6 kg. The improved multimodal resins of the invention are further characterized by having zero shear viscosities ≥7×10$^6$ poise. η$_o$ values obtained for the resins generally range from 7×10$^6$ up to 1×10$^7$ poise and, in a highly preferred embodiment, from 7.2×10$^6$ to 9.5×10$^6$ poise.

Plastic pipe is produced by extruding molten polymer through an annular die. The pipe is formed by passing the molten extrudate through a sizing sleeve and then to a cooling tank where water is sprayed on the outer surface. Solidification proceeds from the outer surface radially inward. Since polyethylene has a low thermal conductivity, cooling times for thick-walled polyethylene pipes are quite long. This can result in the melt flowing under its own weight downward on the side of the pipe (sag) where the pipe has not solidified and result in significant non-uniformity of wall thickness for thick-walled pipes. While sagging of polyethylene pipe can be somewhat compensated for by adjusting the die eccentricity, i.e., increasing the gap width at the top of the die and decreasing the gap width at the bottom utilizing a trial and error procedure until an acceptable uniformity of thickness is obtained, there exists a need in the industry for polyethylene resins with increased sag resistance. Sag resistance can be increased by increasing the zero-shear melt viscosity η$_o$.

Pipe extruded using the multimodal PE resins of the invention compounded with a carbon black concentrate to give a final carbon black loading of 2-3 wt. % meet the PE4710 and PE100 requirements set out in Technical Report TR-4 of the Plastics Pipe Institute (PPI). A 4-inch diameter, DR11 pipe made with the carbon black-filled material also meets the following criteria:

Resistance to Rapid Crack Propagation (ISO 13477), P$_c$@32° F.>10 bar

Resistance to Rapid Crack Propagation (ISO 13477), T$_c$@5 bar <20° F.

Notched Pipe Test (ISO 13479), 80° C., 4.6 MPa>500 hours

The following examples illustrate the invention more fully. Those skilled in the art will, however, recognize many variations that are within the spirit of the invention and scope of the claims.

In all of the examples the multimodal PE product recovered from the second reactor, which was an intimate mixture of LMW HDPE and HMW PE, was dried and the resulting powder sent to a finishing operation where it was compounded in a mixer/melt pump at 260° C. and under a nitrogen atmosphere with 2000 ppm Ca/Zn stearate and 3200 ppm hindered phenol/phosphite stabilizers and pelletized. Density, HLMI and rheological properties were obtained using the finished/pelletized resins.

The melt rheology of the multimodal resins was characterized by performing dynamic oscillatory measurements at 190° C. in parallel plate mode using a Rheometrics ARES rheometer. Dynamic rheology data were generated in the frequency sweep made in accordance with ASTM 4440-95a. Measurements were made under nitrogen to minimize oxidation. The gap in the parallel plate geometry was typically 1.2-1.4 mm, the plate diameter was 50 mm, and the strain amplitude was 10%. Frequencies ranged from 0.0251 to 398.1 rad/sec.

The zero shear viscosity is derived utilizing a Carreau-Yasuda (CY) model (R. B. Bird, R. C. Armstrong, and O. Hassager, Dynamics of Polymeric Liquids, Vol. 1, 2nd ed., Wiley, New York (1987)), which describes the dependence of viscosity on shear rate through the following equation:

$$\eta(\dot{\gamma}) = \eta_o [1+(\lambda\dot{\gamma})^a]^{(n-1)/a}$$

where η$_o$ is the zero-shear viscosity, λ is the relaxation time, $\dot{\gamma}$ is the shear rate, a is a parameter related to the rheological breadth and n is a power law parameter.

Example 1

Ethylene, hexane, a high activity titanium catalyst slurry, TEAL cocatalyst and hydrogen were continuously fed into a stirred polymerization reactor to make a low molecular weight high density polyethylene (LMW HDPE) resin. The catalyst was prepared in accordance with Example 4 of U.S. Pat. No. 4,464,518 and diluted with hexane to the desired titanium concentration. The TEAL was also fed as a hexane solution. Feed rates were normalized with respect to the reactor volume in gallons. Feed rates and polymerization conditions employed in the first reactor and MI$_2$ and density of the LMW HDPE produced were as follows:

| | |
|---|---|
| Pressure (psig) | 145 |
| Temperature (° F.) | 179 |
| Ethylene (lbs/hr/gal) | 1.04 |
| Hexane (Total) (lbs/hr/gal) | 1.93 |
| Catalyst Slurry (moles Ti/hr/gal) | 5.54 × 10$^{-5}$ |
| Cocatalyst (moles/hr/gal) | 1.7 × 10$^{-3}$ |
| H$_2$ (lbs/hr/gal) | 1.5 × 10$^{-3}$ |
| H$_2$/Ethylene mole ratio | 4.7 |
| MI$_2$ (g/10 min) | 165 |
| Density (g/cm$^3$) | 0.9703 |

A portion of the reaction mixture from the first reactor was continuously transferred to a flash drum where hydrogen, unreacted ethylene and some of the hexane were removed. The hexane slurry recovered from the flash drum containing the LMW HDPE, residual catalyst and residual cocatalyst was then transferred to a second stirred polymerization reactor to which fresh hexane, ethylene and hydrogen were fed along with butene-1 comonomer. No additional catalyst or cocatalyst was added to the second reactor. Copolymerization conditions employed in the second reactor to produce the high molecular weight lower density polyethylene (HMW PE) copolymer component were as follows:

| | |
|---|---|
| Pressure (psig) | 25 |
| Temperature (° F.) | 169 |
| Ethylene (lbs/hr/gal) | 0.89 |
| Butene-1 (lbs/hr/gal) | 0.034 |
| Hexane (lbs/hr/gal) | 1.66 |
| $H_2$ (lbs/hr/gal) | $1.57 \times 10^{-6}$ |
| Butene-1/Ethylene mole ratio | 0.054 |
| $H_2$/Ethylene mole ratio | 0.043 |

The resulting multimodal resin powder contained 52 weight percent LMW HDPE homopolymer and 48 weight percent HMW PE copolymer. The density, HLMI and zero shear viscosity ($\eta_o$) of the finished/pelletized multimodal resin are reported in Table 1.

To evaluate stress crack properties, test specimens were prepared from the multimodal resin and tested for SCG and RCP resistance using the so-called PENT test (ASTM F 1473-94) and the Charpy impact test ASTM F 2231-02. Test results are reported in Table 1.

Example 2

Following the same procedure as described in Example 1, a multimodal PE resin was produced. The catalyst and cocatalyst were the same as used in Example 1. However, for this example gases recovered from the flash vessels were recycled into the first reactor. As a result, a small amount of comonomer (butene-1) was present in the first reactor. Feed rates and conditions employed in the first reactor were as follows:

| | |
|---|---|
| Pressure (psig) | 143 |
| Temperature (° F.) | 179 |
| Ethylene (lbs/hr/gal) | 1.00 |
| Hexane (total) (lbs/hr/gal) | 1.87 |
| Catalyst Slurry (moles Ti/hr/gal) | $6.4 \times 10^{-5}$ |
| Cocatalyst (moles/hr/gal) | $1.6 \times 10^{-3}$ |
| $H_2$ (lbs/hr/gal) | $1.1 \times 10^{-3}$ |
| $H_2$/Ethylene mole ratio | 4.6 |
| Butene-1/Ethylene mole ratio | 0.005 |

The LMW HDPE produced in the first reactor had a density of 0.9688 g/cm$^3$ and MI$_2$ of 169 g/10 min.

Feed rates and conditions in the second reactor were as follows:

| | |
|---|---|
| Pressure (psig) | 26 |
| Temperature (° F.) | 169 |
| Ethylene (lbs/hr/gal) | 0.86 |
| Butene-1 (lbs/hr/gal) | 0.034 |
| Hexane (lbs/hr/gal) | 1.61 |
| $H_2$ (lbs/hr/gal) | $2.63 \times 10^{-6}$ |
| Butene-1/Ethylene mole ratio | 0.067 |
| $H_2$/Ethylene mole ratio | 0.038 |

The composition ratio of the final multimodal product was 52 wt. percent LMW HDPE and 48 wt. percent HMW PE copolymer produced in the second reactor. Density, HLMI and $\eta_o$ of the multimodal PE resin as well as the SCG and RCP test results are reported in Table 1.

Comparative Example 3 and 4

To demonstrate the improved resin properties unexpectedly achieved by conducting the copolymerization in the second reactor at the high end of the temperature range and at low comonomer to ethylene molar ratios and low hydrogen to ethylene molar ratios, comparative examples 3 and 4 are provided. For both of these comparative examples, the catalyst and cocatalyst were the same as used in Example 1. Polymerization conditions employed in the first reactor were essentially the same as employed for the process of the invention. However, conditions employed for the ethylene/butene-1 copolymerization in the second reactor were outside the parameters of the present invention in one or more respects.

Feed rates and reactor conditions employed in the first reactor for the comparative examples and the density and MI$_2$ of the resulting LMW HDPE resins produced therein were as follows:

| | Comp Ex 3 | Comp Ex 4 |
|---|---|---|
| Pressure (psig) | 153 | 125 |
| Temperature (° F.) | 179 | 179 |
| Ethylene (lbs/hr/gal) | 0.94 | 1.09 |
| Hexane (total) (lbs/hr/gal) | 1.75 | 2.26 |
| Catalyst Slurry (moles Ti/hr/gal) | $4.9 \times 10^{-5}$ | $6.1 \times 10^{-5}$ |
| Cocatalyst (moles/hr/gal) | $1.4 \times 10^{-3}$ | $2.1 \times 10^{-3}$ |
| $H_2$ (lbs/hr/gal) | $1.2 \times 10^{-3}$ | $1.3 \times 10^{-3}$ |
| $H_2$/Ethylene mole ratio | 4.7 | 5.3 |
| Butene-1/Ethylene mole ratio | 0.007 | 0.009 |

Feed rates and reactor conditions employed in the second reactor to produce the HMW PE copolymer resin component for the comparative resins were as follows:

| | Comp Ex 3 | Comp Ex 4 |
|---|---|---|
| Pressure (psig) | 31 | 25 |
| Temperature (° F.) | 170 | 158 |
| Ethylene (lbs/hr/gal) | 0.80 | 0.93 |
| Butene-1 (lbs/hr/gal) | 0.033 | 0.039 |
| Hexane (lbs/hr/gal) | 1.49 | 1.95 |
| $H_2$ (lbs/hr/gal) | $7.7 \times 10^{-6}$ | $1.3 \times 10^{-5}$ |
| Butene-1/Ethylene mole ratio | 0.073 | 0.09 |
| $H_2$/Ethylene mole ratio | 0.064 | 0.102 |

Both of the comparative resins (Comp Ex 3 and Comp Ex 4) contained 52 wt. % of the LMW HDPE component and 48 wt. % of the HMW PE copolymer component. Densities, HLMIs and zero shear viscosities for the comparative resins and stress crack properties (SCG and RCP) are provided in Table 1.

TABLE 1

| | Ex 1 | Ex 2 | Comp Ex 3 | Comp Ex 4 |
|---|---|---|---|---|
| Density (g/cm$^3$) | 0.9499 | 0.9483 | 0.9490 | 0.9485 |
| HLMI (g/10 min) | 6.7 | 6.3 | 9.3 | 9.9 |
| $\eta_o$ (poise) | $7.6 \times 10^6$ | $8.4 \times 10^6$ | $6.7 \times 10^6$ | $5.4 \times 10^6$ |
| PENT (hrs @ 2.4 MPa) | 4466 | 8013 | 2655 | 3262 |
| Charpy (kJ/m$^2$) | 32.7 | 32.6 | 22.1 | 18.8 |

The unexpected ability to produce multimodal PE resins having improved melt strength, i.e., low shear viscosity, by the process of the invention wherein the copolymerization in the second reactor is carried out at a high temperature and at low $H_2$/ethylene and low butene-1/ethylene ratios is apparent from the above data. Whereas $\eta_o$ for the resins of Ex 1 and Ex 2 were $7.6 \times 10^6$ and $8.40 \times 10^6$ poise, respectively, $\eta_o$ of Comp Ex 3 produced using a high temperature (170° F.) in the second reactor but with $H_2$/ethylene and butene-1/ethylene ratios above that required for the inventive process, was unexpectedly lower. Similarly, for the multimodal resin produced in Comp Ex 4, where conditions (temperature, $H_2$/ethylene ratio and butene-1/ethylene ratio) employed in the second reactor approximated those heretofore used for the production of HDPE resins and all of which are outside the ranges specified for the process of the invention, the zero shear viscosity of the resulting resin was only $5.4 \times 10^6$ poise. It should be noted that the cited improvement in melt strength was achieved even though the LMW HDPE resin produced in the first reactor for both the inventive and comparative resins was essentially the same. The ability to significantly improve the melt strength only by varying conditions in the second reactor is unexpected. Furthermore, it should be noted that the improvement in melt strength was accomplished while improving the stress crack properties of the resins. Both of the resins of the invention met the requirement of PE100 and PE 4710 for pipe resins.

Pipe Extrusion

To demonstrate the improved results achieved with the multimodal resins produced in accordance with the process of the invention, the resin of Example 2 was used for the production of thick-walled, large diameter, black-filled pipe. The resin was extruded on a commercial extrusion line with a carbon black concentrate to achieve a final black loading of 2.2 wt. % using a 150 mm grooved feed single screw extruder with six (6) heating zones to produce a 30 inch (O.D.) pipe having a wall thickness of 3.3 inch. Temperatures in the 6 heating zones were 390° F. (zone 1), 375° F. (zone 2), 370° F. (zones 3 and 4), 365° F. (zone 5) and 370° F. (zones 6 and at the exit die). At a screw speed of 41 rpm, the head pressure was 3280 psig and extrusion rate was 1786 lbs/hr. The extruded pipe had excellent surface finish and sag was minimal. A maximum deviation in wall thickness of only 2.12% was observed.

In contrast, when a commercially available HDPE resin made using a chromium catalyst and specifically designed for high performance pipe applications was extruded under similar conditions, appreciably higher wall spread, i.e., deviation in wall thickness, was obtained. This is surprising in view of the fact that chrome resins are known to contain long-chain branching which is generally considered by those skilled in the art to enhance melt strength.

I claim:

1. A multimodal polyethylene resin, said multimodal resin comprised of:
   (i) a first polyethylene resin having a first molecular weight and having a density from 0.965 to 0.975 g/cm$^3$ and MI$_2$ from 50 to 400 g/10 min and
   (ii) a second copolymer resin comprising lower density ethylene-C$_{3-8}$ α-olefin copolymer resin having a second molecular weight wherein the second molecular weight is higher than the first molecular weight,
   wherein said multimodal resin having a density from 0.947 to 0.950 g/cm$^3$, HLMI from 2 to 8 g/10 min and zero shear viscosity from $7 \times 10^6$ to $1 \times 10^7$ poise.

2. The multimodal polyethylene resin of claim 1 wherein the weight ratio of the first polyethylene resin to the second copolymer resin is from 55:45 to 50:50.

3. The multimodal polyethylene resin of claim 2 wherein the second copolymer resin is an ethylene-butene-1 copolymer.

4. The multimodal polyethylene resin of claim 3 having a density from 0.947 to 0.949 g/cm$^3$, HLMI from 3 to 7 g/10 min and zero shear viscosity from $7.2 \times 10^6$ to $9.5 \times 10^6$ poise.

5. Extruded pipe comprising the multimodal polyethylene resin of claim 1.

6. The extruded pipe of claim 5 further characterized as meeting the requirements of PE 4710 and PE 100.

* * * * *